No. 790,756. PATENTED MAY 23, 1905.
J. A. SECHREST & H. C. EDWARDS.
COMBINED PLANTER AND FERTILIZER DISTRIBUTER.
APPLICATION FILED JAN. 14, 1905.
3 SHEETS—SHEET 1.
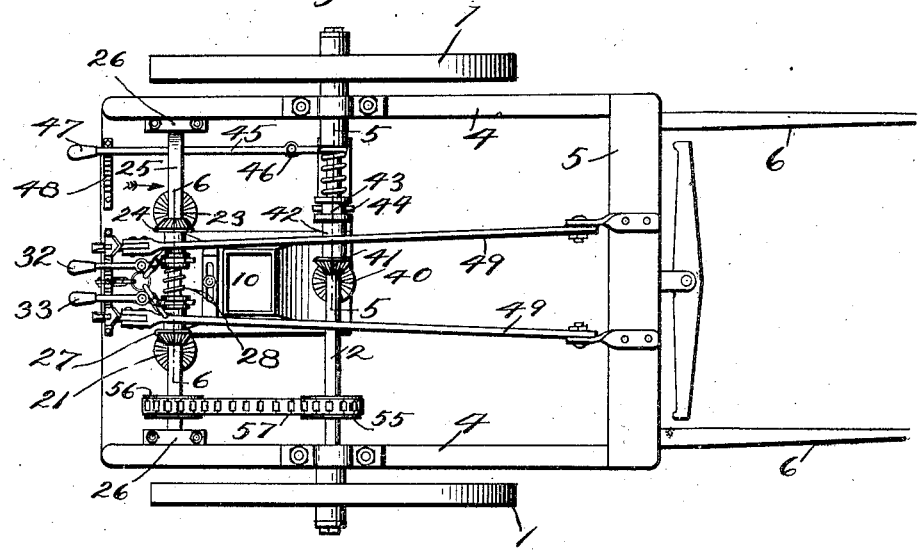
Fig. 1.
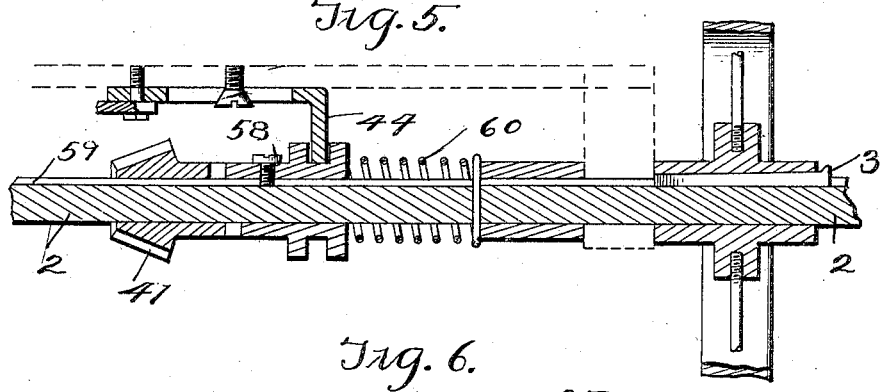
Fig. 5.
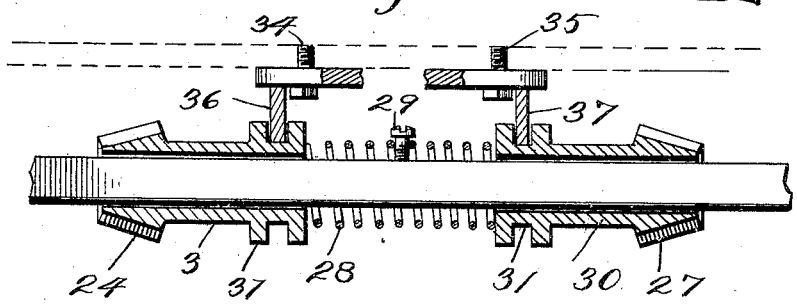
Fig. 6.
Witnesses
W. R. Taylor
S. W. Fitzgerald
Inventors
J. A. Sechrest, and
H. C. Edwards.
By 
Attorneys No. 790,756. PATENTED MAY 23, 1905.
J. A. SECHREST & H. C. EDWARDS.
COMBINED PLANTER AND FERTILIZER DISTRIBUTER.
APPLICATION FILED JAN. 14, 1905.
3 SHEETS—SHEET 3.
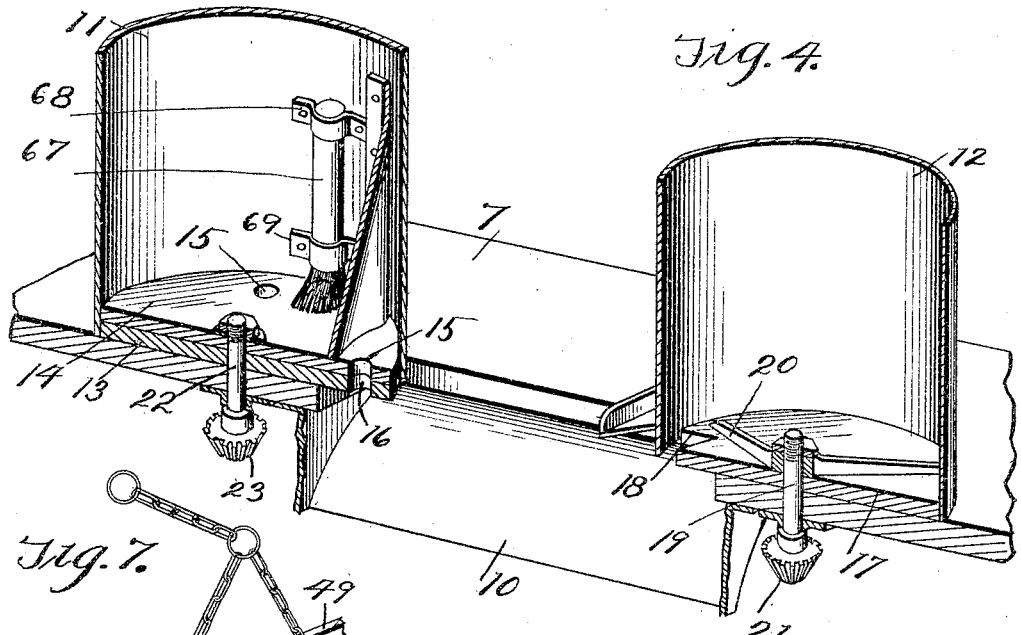
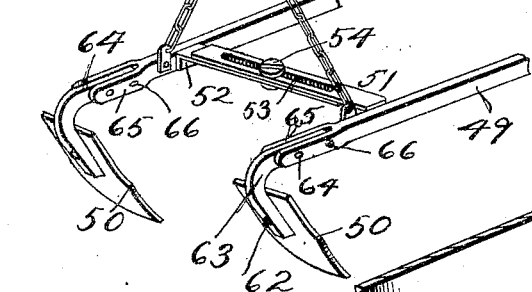
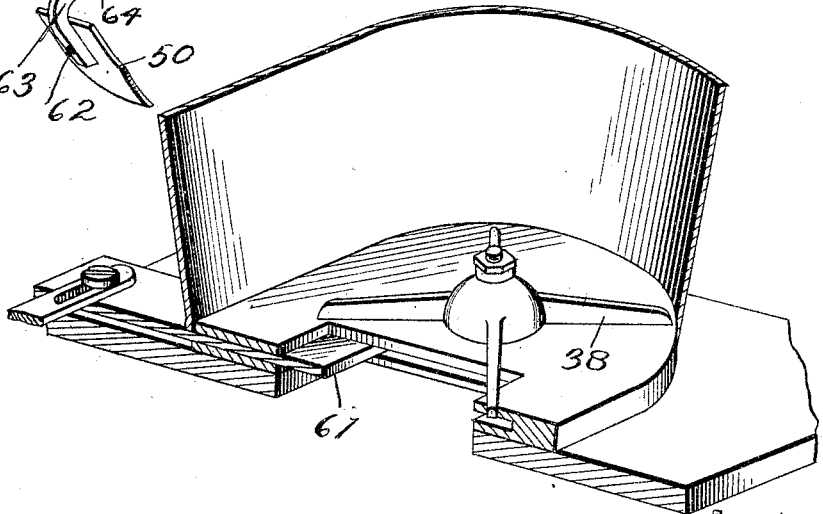
Inventors
J. A. Sechrest, and
H. C. Edwards.
Witnesses
W. R. Taylor.
S. E. Fitzgerald.
By 
Attorneys No. 790,756.

Patented May 23, 1905.

UNITED STATES PATENT OFFICE.

JOHN A. SECHREST AND HENRY C. EDWARDS, OF KERNERSVILLE, NORTH CAROLINA.

COMBINED PLANTER AND FERTILIZER-DISTRIBUTER.

SPECIFICATION forming part of Letters Patent No. 790,756, dated May 23, 1905.

Application filed January 14, 1905. Serial No. 241,051.

*To all whom it may concern:*

Be it known that we, JOHN A. SECHREST and HENRY C. EDWARDS, citizens of the United States, residing at Kernersville, in the county of Forsyth and State of North Carolina, have invented certain new and useful Improvements in a Combined Planter and Fertilizer-Distributer; and we do hereby declare the following to be a full, clear, and exact description of the invention, such as will enable others skilled in the art to which it appertains to make and use the same.

Our invention relates to combined planters and fertilizer-distributers; and it consists of certain novel features of construction and combination of parts, the preferred form whereof will be hereinafter clearly set forth, and pointed out in the claim, the main object of our invention, among others, being to provide a reliably-efficient machine of the character specified which may be adjusted to drop or plant any variety of grain and also to deliver into the furrow simultaneously with the grain any desired quantity of commercial fertilizer and also any preferred quantity of barn-yard manure or the like without necessitating any special care in preparing the manure for the action of our machine.

A further object of our invention is to provide a machine of great simplicity and the parts of which may be very cheaply and expeditiously manufactured and each readily assembled in its respective operative position.

Other objects and advantages will be hereinafter made clearly apparent, reference being had to the accompanying drawings, which are considered a part of this application, and in which—

Figure 2:
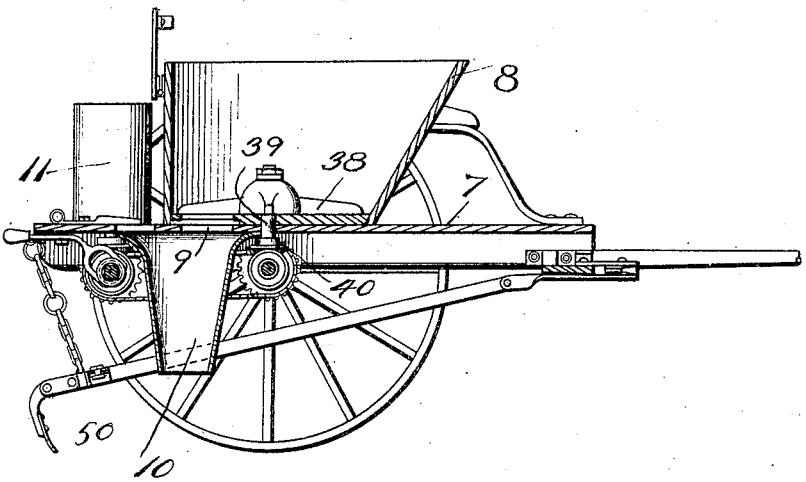
Figure 3:
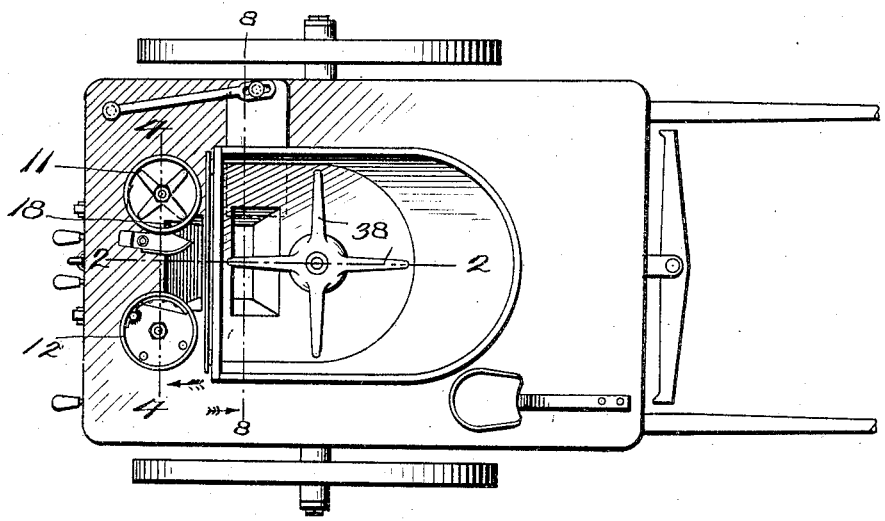

Figure 1 shows a bottom plan view of our invention. Fig. 2 is a sectional view taken on line 2 2 of Fig. 3. Fig. 3 is a top plan view of our invention. Fig. 4 is a sectional view as taken on line 4 4 of Fig. 3 on an enlarged scale. Fig. 5 shows a sectional view as taken on line 5 5 of Fig. 1 on an enlarged scale. Fig. 6 is a sectional view as taken on line 6 6 of Fig. 1 on an enlarged scale. Fig. 7 is a detail perspective view of the shovels or covering-blades, showing means of adjusting the same relatively to each other; and Fig. 8 is a sectional view taken on line 8 8 of Fig. 3 on an enlarged scale.

In referring to the various details of our invention and accessories designed to coöperate therewith numerals will be employed, the same numeral applying to a similar part throughout the several views, and, referring to the numerals on the drawings, 1 designates the carrying-wheels, of the usual or any preferred construction, which are mounted upon the supporting-axle 2 in any suitable manner and caused to rotate therewith by a suitable pin or key 3. Upon the supporting-axle thus or otherwise constructed we mount the side rails 4 of the frame connected together at their forward ends by the bar 5 or equivalent thereof, to which we attach the shafts 6 or tongue, if the latter should be employed, whereby the draft-animals may be secured to the machine.

Upon the framework we mount the platform 7, and upon said platform we secure the main hopper-section 8, designed to hold the manure in position to be discharged through the opening 9 into the conveyer tube or chute 10, and we also mount, preferably to the rear of the main hopper 8, the auxiliary hoppers 11 and 12 for commercial fertilizer and grain, respectively. The grain-hopper is secured to the platform in a reliable way and is provided with the stationary bottom 13, with a rotating feed-plate 14, which latter is provided with a plurality of apertures 15 near its periphery, designed to be brought successively into registration with the aperture 16 in the plate 13, said aperture 16 communicating directly with the conveyer tube or chute 10, and in like manner we mount the auxiliary hopper 12 for commercial fertilizer, which is provided with a stationary bottom 17, said stationary bottom having a tapered opening or recess 18. Designed to rotate within suitable bearings provided in the stationary bottom 17 and in a contiguous part of the platform or framework is the shaft 19, having upon its upper end a plurality of arms or fingers 20 and on its lower end the gear 21. We also mount in suitable bearings carried by the platform the shaft 22, having upon its upper end the plate 14, rigidly secured thereto, whereby said plate will be rotated over the stationary bottom 13, the said shaft 22 having upon its lower end the controlling-gear 23, as clearly shown in Fig. 4.

The gear 23 is disposed in mesh with the gear 24, located upon the square shaft 25, which latter is provided with journals at each end, disposed in the bearings 26, carried by the framework, while the gear 21 is disposed in mesh with the gear 27, also located upon said shaft 25, and the gears 24 and 27 are held normally in mesh with their respective gears by compression-spring 28, disposed around the shaft 25, a suitable set-screw 29 being entered in the shaft to hold said spring in position and divide its force between the gears 24 and 27, it being understood that each of said gears is provided with a tubular extension or neck 30 and with a grooved collar 31 in order that said gears may be placed under the control of the operator. We have also provided controlling-levers 32 and 33, one for each of the gears 24 and 27, said levers being pivotally secured in position, respectively, by the set screws or bolts 34 and 35, and each lever respectively having a finger or extension 36 and 37 for engagement with the grooved collar 31, and it is therefore obvious that either or both gears may be quickly thrown into or out of mesh with its respective gear 21 and 23, as the case may be. We provide upon the rear edge of the framework a ratchet-plate for each of the levers 32 and 33 or a suitable stop-pin for holding the gears in a retracted position, as will be readily obvious. The main hopper-section 8 is in like manner provided with a plurality of swinging arms 38, secured to the upper end of the controlling-shaft 39, which latter is mounted in suitable bearings and provided at its lower end with a controlling-gear 40, the latter being normally in mesh with the gear 41, located upon the carrying-axle 2, said gear 41 having the tubular extension 42 fitting around the axle and also a grooved collar 43 to be engaged by the controlling-fingers 44, connected to the lever 45, which latter is pivotally mounted, as indicated by the numeral 46, upon the under side of the platform, the rear end of the lever being provided with a suitable handle 47, as clearly shown in Fig. 1. In like manner we have provided a ratchet-plate 48 for coöperation with the end of the lever 45, whereby it may be held in any desired adjustment. By reference to Figs. 1 and 7 it will also be observed that we have provided the plow beams or bars 49, each having a shovel 50 at its rear end, said shovels being properly spaced and held in an adjusted position by means of the overlapping bars 51 and 52, the bar 51 being provided with a slot 53, while the bar 52 has a threaded seat to receive the set-screw 54, and it is therefore obvious that the overlapping bars may be readily secured at any desired point relative to each other, thereby holding the shovels 50 a suitable distance apart or to properly perform the work of covering the seed and also the fertilizer discharged through the conveyer-chute 10.

Upon the shaft or axle 2 we secure the driving sprocket-wheel 55, placed in communication with the sprocket-wheel 56, secured upon the shaft 25, through the mediation of the sprocket chain or belting 57, as clearly shown in the bottom plan view, Fig. 1.

The gear 41 is secured to the shaft 2 and caused to rotate therewith by means of the set-screw 58 reaching into the groove 59, formed in the axle, thereby enabling the controlling members 44, through the mediation of the lever 45, to readily reciprocate the gear 41 upon said shaft, the compression-spring 60 being provided, as shown in Fig. 5, to normally hold the gear 41 in mesh with the gear 40.

The fingers or arms 38 act upon the manure contained in the hopper 8 and cause the same to be delivered in required quantities downward through the openings 9 and thence upon the ground through the conveyer chute or tube 10, which latter is preferably provided with a slide or closing member 61, whereby the size of the opening may be easily controlled.

The shovel members 50 are connected in any suitable manner, as by the bolts 62, to the shank or standard 63, which latter is received between the members 64 and 65 of the bifurcated ends of the beams or bars 49, whereby a breakable wooden pin 66 may be employed, as is common with connections of this kind.

We prefer to taper the discharging-recess 18 in the bottom of the hopper 12, whereby said recess will not be so liable to become clogged through the action of the arms 20, as will be readily apparent.

Within the grain-hopper 11 we dispose the brush 67, the latter being held in the brackets 68 and 69 or the equivalent thereof, thus insuring that any foreign substance will be forced through the openings 15 and not clog any of the same.

Our combined planter and fertilizer-distributer will therefore be found especially efficient and useful as a single-row manure-distributer, a machine that will operate efficiently with the coarsest barn-yard manure and dispose the same in a single row and in any desired quantity. We therefore lay special stress upon the importance and value of our single-row manure-distributer, though the grain-hopper and the hopper for commercial fertilizer may also be provided, if deemed desirable, and believing that the construction, advantages, and manner of using our invention have been made clearly apparent further reference to the details is dispensed with.

Having thus fully described our invention, what we claim as new, and desire to secure by Letters Patent, is—

The herein-described single-row manure-distributer and planter comprising suitable carrying-wheels; a frame mounted thereon; a main hopper 8 having an opening; a conveyer-chute 10 communicating with said opening; means to deliver manure from said hopper through said conveyer-chute in any desired quantities, in combination with auxiliary hoppers 11 and 12; means located within the hopper 11 to deliver grain therefrom in any desired quantities into said conveyer-chute and additional means located in the other auxiliary hopper designed to deliver commercial fertilizer therefrom into said conveyer-chute all combined substantially as specified and for the purpose set forth.

In testimony whereof we have signed our names to this specification in the presence of two subscribing witnesses.

JOHN A. SECHREST.
HENRY C. EDWARDS.

Witnesses:
F. M. EDWARDS,
A. S. DAVIS.